(12) United States Patent
Posthuma

(10) Patent No.: US 6,952,417 B1
(45) Date of Patent: Oct. 4, 2005

(54) SYSTEM AND METHOD FOR SELECTIVELY PROVIDING DATA COMMUNICATIONS IN AN XDSL COMMUNICATION SYSTEM

(75) Inventor: Carl Robert Posthuma, Wheaton, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/524,476

(22) Filed: Mar. 13, 2000

(51) Int. Cl.[7] ............................................. H04L 12/50
(52) U.S. Cl. ...................... 370/360; 370/421; 370/424; 370/463; 370/491; 370/500
(58) Field of Search ................................ 370/357, 360, 370/311, 421, 424, 352, 463, 481, 500; 379/93.01, 379/93.06, 258, 268, 306

(56) References Cited

U.S. PATENT DOCUMENTS

| | | | |
|---|---|---|---|
| 5,668,857 A | | 9/1997 | McHale |
| 5,905,781 A | | 5/1999 | McHale |
| 5,970,088 A | * | 10/1999 | Chen .......................... 375/222 |
| 5,995,540 A | | 11/1999 | Draganic |
| 6,052,411 A | * | 4/2000 | Mueller et al. ............. 375/222 |
| 6,069,880 A | * | 5/2000 | Owen et al. ................ 370/311 |
| 6,115,607 A | * | 9/2000 | Holcman .................... 455/435 |
| 6,201,830 B1 | * | 3/2001 | Chellali et al. ............. 375/222 |
| 6,212,398 B1 | * | 4/2001 | Roberts et al. ............. 455/502 |
| 6,337,984 B1 | * | 1/2002 | Hong et al. ................. 455/439 |
| 6,353,628 B1 | * | 3/2002 | Wallace et al. ............. 375/220 |
| 6,445,730 B1 | * | 9/2002 | Greszczuk et al. ......... 375/219 |
| 6,505,058 B1 | * | 1/2003 | Willey ........................ 455/574 |
| 6,519,280 B1 | * | 2/2003 | Cole ........................... 375/222 |

FOREIGN PATENT DOCUMENTS

| | | |
|---|---|---|
| EP | 0 898 409 | 2/1999 |
| WO | WO 99/52219 | 10/1999 |

* cited by examiner

Primary Examiner—Steven Nguyen
Assistant Examiner—Roberta A Stevens

(57) ABSTRACT

A system and method selectively establishes data communications, such as XDSL services, between data devices and a network switch. Status of the data devices are monitored and active data devices are connected to a data branch for data communications. Data devices which are inactive may remain connected to the data branch, if available, or may be switched to a pilot branch. While disconnected from the pilot branch, the system may detect a signal from the data device indicating that the device is going active. If pilot signals are being used, the pilot signals between a data device and the network switch are monitored to determine when the data device is going active. Once detected, the data device is connected to the data branch. Alternately, if pilot signals are not being used, the system monitors the connection with the data device for any signals, such as a wake-up signal, which indicates that the data device is going active.

14 Claims, 3 Drawing Sheets

SYSTEM AND METHOD FOR SELECTIVELY PROVIDING DATA COMMUNICATIONS IN AN XDSL COMMUNICATION SYSTEM

BACKGROUND OF THE INVENTION

This invention relates to telecommunication equipment which terminates subscriber lines and supports high speed data services for subscribers. The invention is especially suited but not limited to providing high speed data services which exceed the capability of conventional POTS terminating equipment.

In the United States, subscribers are commonly provided with telephone services known as plain old telephone services (POTS). Such services include providing conventional dial tone and automated dialing features, including the use of dual frequency tone signaling to communicate dialed number information. Additional modem telephone features include conferencing, call waiting, incoming caller identification and other commercially available features.

Subscribers utilize a POTS line to carry conventional modem signals controlled by a personal computer to another modem via the public switch telephone network. Modems are currently available which support data communication rates up to 56 Kilobits per second (Kbps) over dial up analog subscriber lines. Those skilled in the art will understand that the maximum data rate which can be transmitted using modems over a POTS subscriber line is limited by the sampling rate, the band width of the channel, and the rate by which the analog signals are converted to digital signals by the line card units which terminate each POTS line at a central office. Thus, conventional modem data rates are limited by POTS line cards which terminate the subscriber lines.

Subscribers in the United States can lease special subscriber lines from their telephone service providers which accommodate higher data rates than are supported by conventional dial up subscriber lines. Such higher speed lines utilize different terminating circuitry at the central office to accommodate higher data rates. For example, integrated service digital network (ISDN) terminating equipment will provide a subscriber with a capability of higher data rates than a conventional POTS terminated line. For example, a known asynchronous digital subscriber line (ADSL) technique which is supported by available equipment provides a significantly higher data rate to a subscriber over a conventional copper two-wire subscriber line. Of course, the ADSL service requires proper terminating equipment at the central office and at the consumer premises to accommodate the greater throughput capabilities, i.e. data rates.

FIG. 1 illustrates some available services in the United States to subscribers using conventional two-wire copper loops. Equipment to the right of the dashed line 100 represents customer premise equipment (CPE). Equipment to the left of the dashed line 100 represents central office line termination equipment. A POTS line interface 102, also known as a line card, provides an interface between digital incoming and outgoing communication lines 104 and 106, and analog signals carried on subscriber line 108. For example, communication lines 104 and 106 may carry 64 Kb per second pulse coded modulation (PCM) signals representative of analog information received from and transmitted to line 108. A main distribution frame (MDF) 110 is used to interconnect a plurality of incoming subscriber lines to various terminating equipment at the central office. In this example, a line 108 is connected through a POTS splitter 112 and the MDF 110 to a subscriber line 114. A conventional telephone instrument 116 at the consumer's premise is connected through a POTS splitter 118 to the subscriber line 114.

FIG. 1 also illustrations another service to the subscriber which provides high speed data capability. An ADSL interface circuit 120 provides an interface between the central office and the subscriber for terminating the received data at rates up to several megabits per second (Mbps). Lines 122 and 124 provide inbound and outbound digital data communications, representative of information to and from the subscriber, carried on line 126. Line 126 is connected via the POTS splitter 112 and the MDF 110 to the subscriber line 114. An ADSL interface 128 provides an interface between conventional digital data, communicated with a subscriber's personal computer 130, and ADSL analog format signaling communicated on a line 132. The POTS splitter 118 couples the ADSL signal between the ADSL interface 128 and the subscriber line 114. The advantage to the user is that the ADSL facilities support a substantially higher-data rate than would be available if the subscriber utilized communications terminated via the POTS line interface 102.

A disadvantage of the system shown in FIG. 1 is that there is one ADSL interface 120 corresponding to each personal computer 130. Additionally, as the number of ADSL subscribers increases, the number of ADSL interfaces connected to the subscriber lines, such as subscriber line 114, must also increase. However, most ADSL service subscribers do not use ADSL services continuously. Thus, the ADSL interfaces 120 will be idle a significant amount of time. At the present, ADSL interface circuitry is expensive. This problem is magnified as more and more subscribers request ADSL service. Therefore, there is a need to provide high speed services, such as ADSL, while minimizing the cost of implementing the services.

SUMMARY OF THE INVENTION

The above need is satisfied and a number of technical advances are achieved in the art by implementation of a system and method in accordance with the present invention which supports routing of XDSL communication data between an XDSL interface branch and a pilot interface branch.

Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below. Since the following is for summary purposes only, none of the aspects present below should be considered essential to the present invention, which is solely defined by the appended claims.

In accordance with an aspect of the present invention, a system establishes data communications with a data device by monitoring whether the data device is active or inactive. If the data device is active, a controller circuit connects the active data device to a data branch to establish data communications. Preferably, the data communications are digital subscriber line communications. The controller circuit further monitors data devices already connected to the data branch to determine whether any of them are inactive. If the controller circuit detects an inactive data device, the controller circuit, if need be, may disconnect the inactive data device and connect a data device becoming active. The inactive data device may be connected to a pilot branch until it again becomes active.

In another aspect of the present invention, a method is provided for selectively connecting active data devices to a data branch to establish data communications. Inactive data devices are detected and either connected to a pilot branch or remains connected to the data branch, if there is available space. The method may detect when an inactive data device becomes active by monitoring pilot signals sent to and from the inactive device in accordance with the ITU standard for G.lite. Alternatively, if pilot tones are not being used, the method monitors the connection to the inactive data device for the presence of signals.

These and other features and advantages of the present invention will become apparent from the following detailed description, the accompanying drawings and the appended claims.

BRIEF DESCRIPTION OF THE DRAWINGS

The foregoing advantageous features of the invention will be described in detail and other advantageous features will be made apparent upon reading the following detailed description that is given with reference to the several figures of the drawings in which.

DETAILED DESCRIPTION

One or more specific versions of the present invention will be described below. In an effort to provide a concise description of these versions, not all features of an actual implementation are described in the specification. It should be appreciated that in the development of any such actual implementation, as in any engineering or design project, numerous implementation-specific decisions must be made to achieve the developer's specific goals, such as compliance with system related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

In accordance with a version of the present invention, a single subscriber line supports at least two different classes of subscriber service, such as POTS and XDSL or other high speed data services. The "X" in XDSL represents one of a family of digital subscriber line services such as ADSL (asynchronous), ADSL Lite, RDSL (rate-adaptive) and VDSL (very high speed). As used herein, high speed data interface refers to apparatus that use a signaling method to provide higher data transmission speeds than can be supported by conventional POTS line transmitting equipment. "X" could also be used in energy mode for SDSL, HDSL, HDSL II and SHDSL where POTS circuitry would not be present.

Figure 1:
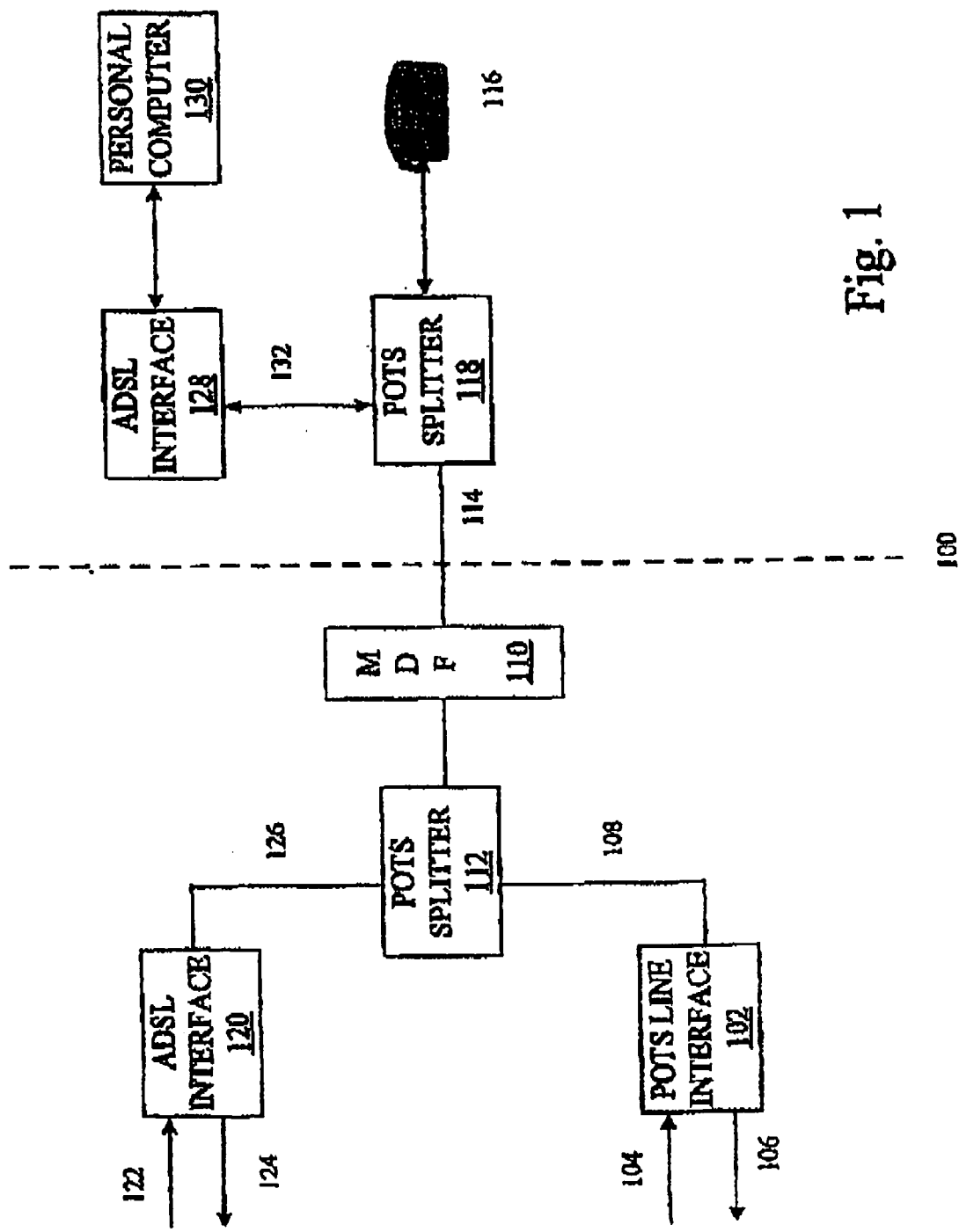
FIG. 1 illustrates a prior art implementation in which a subscriber is provided POTS and high speed data services by using a POTS splitter to support line termination equipment.
Figure 2:
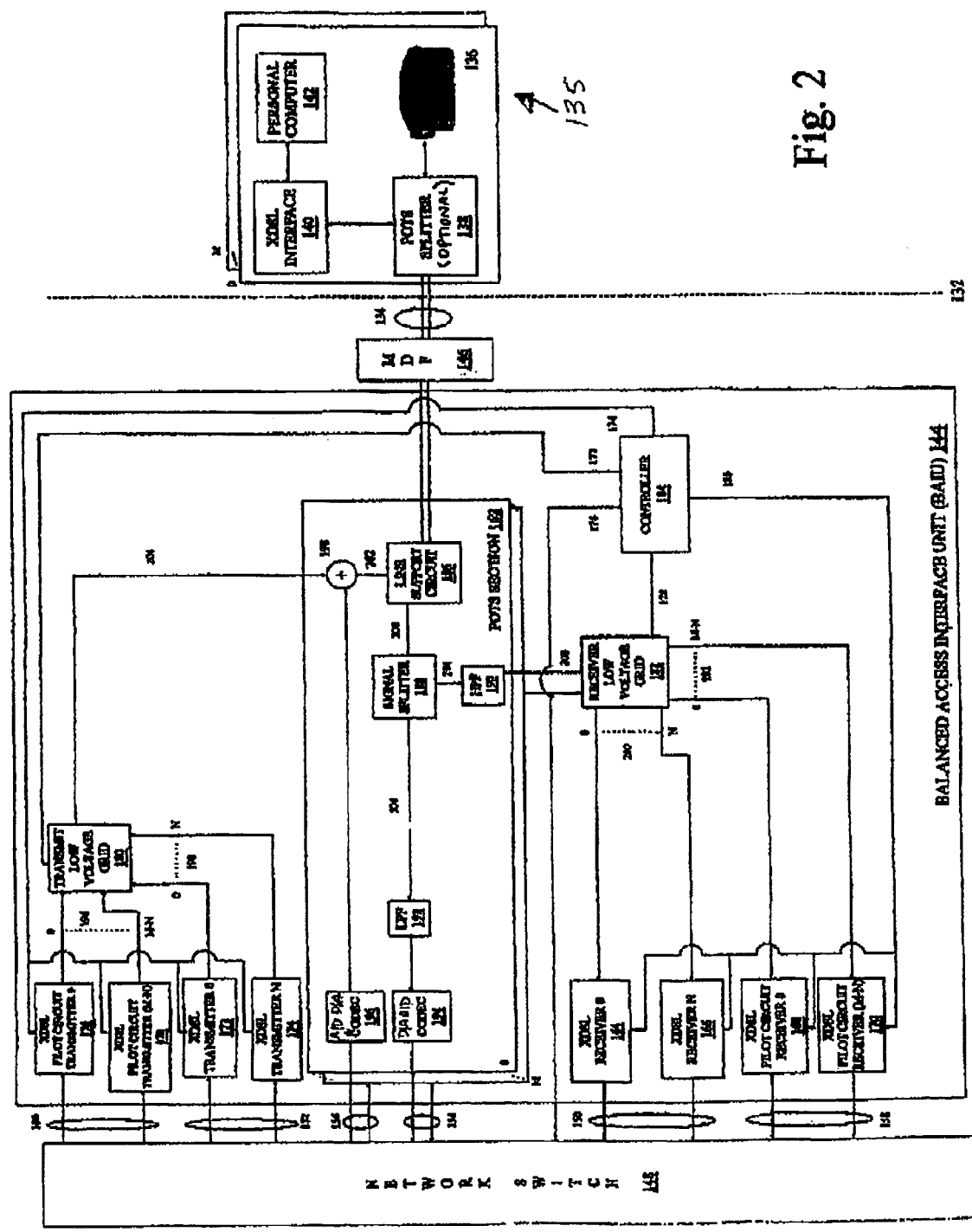
FIG. 2 is a graphical representation of a system for providing POTS and XDSL services in accordance with an aspect of the present invention.

Now, referring to FIG. 2, consumer premises equipment (CPE) 135 is located to the right of a dashed line 132. Central office equipment (COE), including central office line terminating equipment 137, is located to the left of the dashed line 132. A two-wire copper subscriber line (tip and ring) 134, also commonly known as a subscriber loop, connects the CPE 135 with the central office terminating equipment 137. A subscriber may utilize a conventional telephone instrument 136 (such as a telephone) which can be connected to the subscriber line 134 via a POTS splitter 138 to receive POTS signals. The subscriber may elect to couple a high speed data interface (an interface circuit), such as a XDSL interface 140, via a POTS splitter 138 to the subscriber line 134 to support high speed data communications. A high speed data device, shown as a personal computer 142, is illustratively shown connected to the XDSL interface 140. For purposes of this disclosure, a data device may comprise the personal computer 142 and the XDSL interface 140. It will be appreciated, however, by those skilled in the art that high speed data devices other than the personal computer 142 may be utilized to transmit or receive a variety of data representing different types of information.

A balanced access interface unit (BAIU) 144 terminates the subscriber line 134 via a MDF 146. The BAIU 144 is responsible for all interactions and communication signals transmitted to and received from the subscriber line 134. Additionally, the BAIU 144 is responsible for providing separate inbound and outbound data paths for communicating information with the central office switch via a network switch 148, such as utilizing PCM-encoded digital signals or asynchronous transfer mode (ATM) formatted signals. Communication channels 150 and 152 carry inbound and outbound high speed digital information respectively and communication channels 154 and 156 similarly carry inbound and outbound conventional telephone information, respectively. Additionally, respective communication channels 158 and 160 carry inbound and outbound pilot signal information.

The BAIU 144 comprises a plurality of components such as a plurality of: POTS sections 162; XDSL receivers 164 and 166; pilot circuit receivers 168 and 170; XDSL transmitters 172 and 174; and pilot circuit transmitters 176 and 178. The BAIU 144 also includes a transmit low voltage grid 180, a receiver low voltage grid 182 and a controller 184.

As will be discussed below, the XDSL receivers 164 and 166, the XDSL transmitters 172 and 174 and the transmit and receiver grids 180 and 182 comprise a data branch for providing high speed data communications with the personal computer 142. Additionally, the pilot circuit receivers 168 and 170, the pilot circuit transmitters 176 and 178, and the transmit and receiver grids 180 and 182 comprise a pilot branch for connecting with the personal computer 142 when the personal computer 142 is inactive, or in a sleep mode. The pilot branch and the personal computer 142 periodically communicate via pilot signals during a sleep mode period. The controller 184 and transmit and receiver grids 180 and 182 comprise a controller circuit which controls the connection of the data device.

The number M of POTS sections 162, XDSL receivers 164 and 166, pilot circuit receivers 168 and 170, XDSL transmitters 172 and 174 and pilot circuit transmitters 176 and 178 is preferably determined by the central office based on the total number of subscribers using XDSL services. The value of M may selectively be chosen as 0, 4, 8, 16, 32, 64, 128 or greater. Thus, the present invention supports multiple POTS lines or no POTS.

The POTS section 162 comprises a number of subcomponents such as a line support circuit 186, a signal splitter 188, a high pass filter 190, a low pass filter 192, an analog to digital coder-decoder (A/D CODEC) 194, a digital to analog coder-decoder (D/A CODEC) 196 and a combiner circuit 198. All these components are described and reference should be made to U.S. patent application Ser. No. 08/767,138 of Nye et al., filed Dec. 19, 1996, entitled "Telecommunication Equipment Support of High Speed Data Services," which is incorporated by reference herein.

Line support circuit 186 terminates the subscriber line 134 and provides conventional POTS subscriber line support facilities. The line support circuit 186 provides a simplex to duplex communications interface by which duplex communications on the subscriber line 134 are separated into independent transmit and receive communications coupled to the central office. Line 200 carries information from the subscriber and line 202 carries information to be transmitted to the subscriber. Line 200 is coupled to the signal splitter 188, which splits the information received from the subscriber into two substantially equal signals, one signal being applied to line 204 and the other signal being applied to line 206. Line 204 is coupled to the high pass filter 190 and line 206 is coupled to the low pass filter 192. The outputs from the high pass filter 190 and the low pass filter 192 are coupled respectively to the receiver low voltage grid 182, via line 208, and to the A/D CODEC 194. The low pass filter 192 passes signals with frequencies relevant to conventional voice communications, such as below 4 KHz, to the A/D CODEC 194 which translates the analog voice signals into digital signals, such as PCM, which are transmitted on line 154 to a far end CPE via the network switch 148. The high pass filter 190 passes signals with frequencies above the cutoff frequency of the high pass filter 190. The frequencies passed would typically be above 4 KHz as used in known XDSL signaling coding (between about 30 KHz and 1,500 KHz for ADSL). The XDSL receivers 164 and 166 (which are coupled to the receiver low voltage grid 182) convert the high pass filtered signals into other conventional signals, such as ATM signals, which are transmitted on channel 150 to the network switch 148.

Information transmitted to the subscriber line 134 is received from the central office facilities and communication channels 156 and 152. The D/A CODEC 196 receives digital information such as PCM-formatted voice or data to be translated into conventional POTS analog signals. Digital data which may be in ATM format is received on the communication channel 152 via the XDSL transmitter 174, which converts this data into corresponding XDSL analog signals. The XDSL analog signals are then transmitted to the signal combiner 198 via the transmit low voltage grid 180. Likewise, the analog output from the A/D CODEC 194 is sent to the singal combiner 198 which sums the analog signals into a resulting output signal carried on line 202 to the line support circuit 186.

The pilot circuit receivers 168 and 170, pilot circuit transmitters 176 and 178, receiver low voltage grid 182 and transmit low voltage grid 180 are components which allow the central office to balance the use of the XDSL receivers 164 and 166 and the XDSL transmitters 172 and 174. There are N number of XDSL receivers 164 and 166 and XDSL transmitters 172 and 174. The value of N is less than the value of M because preferably not all XDSL subscribers will employ XDSL services simultaneously. Thus, the controller 184 may selectively balance the use of the XDSL branches (receivers 164 and 166 and transmitters 172 and 174) versus the pilot branches (receivers 168 and 170 and transmitters 176 and 178).

The pilot circuits on the pilot branch such as the receivers 168 and 170 and transmitters 176 and 178 are less complex circuits, and therefore typically less expensive, than the corresponding XDSL circuits on the data branch because they are required to process less data. When the personal computer 142 does not communicate with the XDSL interface 140 within a specified time, the XDSL interface 140 goes into a sleep mode. While in sleep mode the XDSL interface 140 does not need to communicate with the network switch 148 through a data, or XDSL, branch. However, communication between the XDSL interface 140 and the network switch 148 can be maintained in sleep mode by using the pilot branch. The pilot branch allows the XDSL interface 140, and thus the personal computer 142, and the network switch 148 to communicate in a very basic manner without having to use the expensive XDSL branch. The pilot branch may be alternatively implemented as a single digital signal processor (DSP) and a single A/D D/A converter. Such a DSP and A/D D/A converter may be capable of processing a plurality of lines.

This basic communication is preferably via pilot tones. A pilot tone is a single tone carrier signal which carries modulated information data. One description of sleep mode, and in particular, the use of pilot tones, is set forth in a G.lite ADSL draft standard from the International Telecommunications Union (ITU). The ITU has further issued a G.lite ADSL standard which operates in a level 3 (L3) mode as discussed below. Additionally, new low power modes are being developed by the telecommunications industry. For example, a level 1 (L1) mode operation in G.lite is being developed as a low power mode. Another mode is commonly designated as Quiescent mode (Qmode). Further, Qmode is being considered for standards other than G.lite, as well. As those skilled in the art will readily comprehend, the present invention may be advantageously implemented in any number of low power modes, including both those which utilize pilot tones and those which do not.

In accordance with the present invention, the XDSL pilot circuit receivers 168 and 170 receive pilot tones from the XDSL interface 140 while the XDSL interface 140 is in a sleep mode. When the XDSL interface 140 is ready to transmit information, it transmits a pilot tone (wake-up signal) indicating a desire to transmit XDSL information. One of the XDSL pilot circuit receivers 168 or 170 detects the wake-up signal and signals to the controller 184 that the XDSL interface 140 desires to transmit XDSL information. The controller 184 then instructs the receiver low voltage grid 182 and the transmit low voltage grid 180 to switch the connection with the XDSL interface 140 to the XDSL branch. In response to these instructions, the receiver low voltage grid 182 connects the XDSL interface 140 to one of the XDSL receivers 164 and 166. Similarly, the transmit voltage grid 180 connects the XDSL interface 140 to one of the XDSL transmitters 172 and 174. After these connections, the XDSL interface 140 is ready to transmit and receive XDSL communications.

Before the XDSL interface 140 is switched from the pilot branch to the XDSL branch, it may be necessary to switch another XDSL interface from the XDSL branch to the pilot branch. The controller 184 thus checks for an inactive XDSL interface which is connected to the XDSL branch. When such an inactive XDSL interface is identified, the controller 184 instructs the transmit low voltage grid 180 and the receiver low voltage grid 182 to switch the inactive XDSL interface to the pilot branch. In this manner, inactive XDSL interfaces can be connected to the relatively simple and inexpensive pilot branch until they activate. Consequently, the BAIU 144 can consist of less of the components in the complex and expensive XDSL branch while still providing XDSL service to numerous XDSL interfaces.

Alternatively, the BAIU 144 may have excess capacity in the XDSL branch and/or the pilot branch. In such a situation, it may not be necessary to "switch" both active and inactive XDSL interfaces. In other words, there may be an open XDSL branch which to connect the XDSL interface 140.

Although the description herein is made in reference to various hardware and software systems, it should be appreciated that the teachings of the present invention are not limited for use with only such systems and that, instead, the teaching of the present invention is applicable to a large number of possible hardware and software embodiments. For example, different combinations of multiple pilot branches and/or multiple XDSL branches may be implemented on a single DSP. The DSP could then allocate its resources automatically as needed on the multiple channels. Similarly, multiple channels of POTS signals may be supported by a single DSP. Alternatively, POTS may not be supported in the present invention. The present invention provides reduced services (i.e. less than full service) with less resources when the CPE is not operating at full usage. Experience has shown that a typical CPE operates at less than full usage a high percentage of the time, thus the present invention results in a cost savings.

Figure 3:
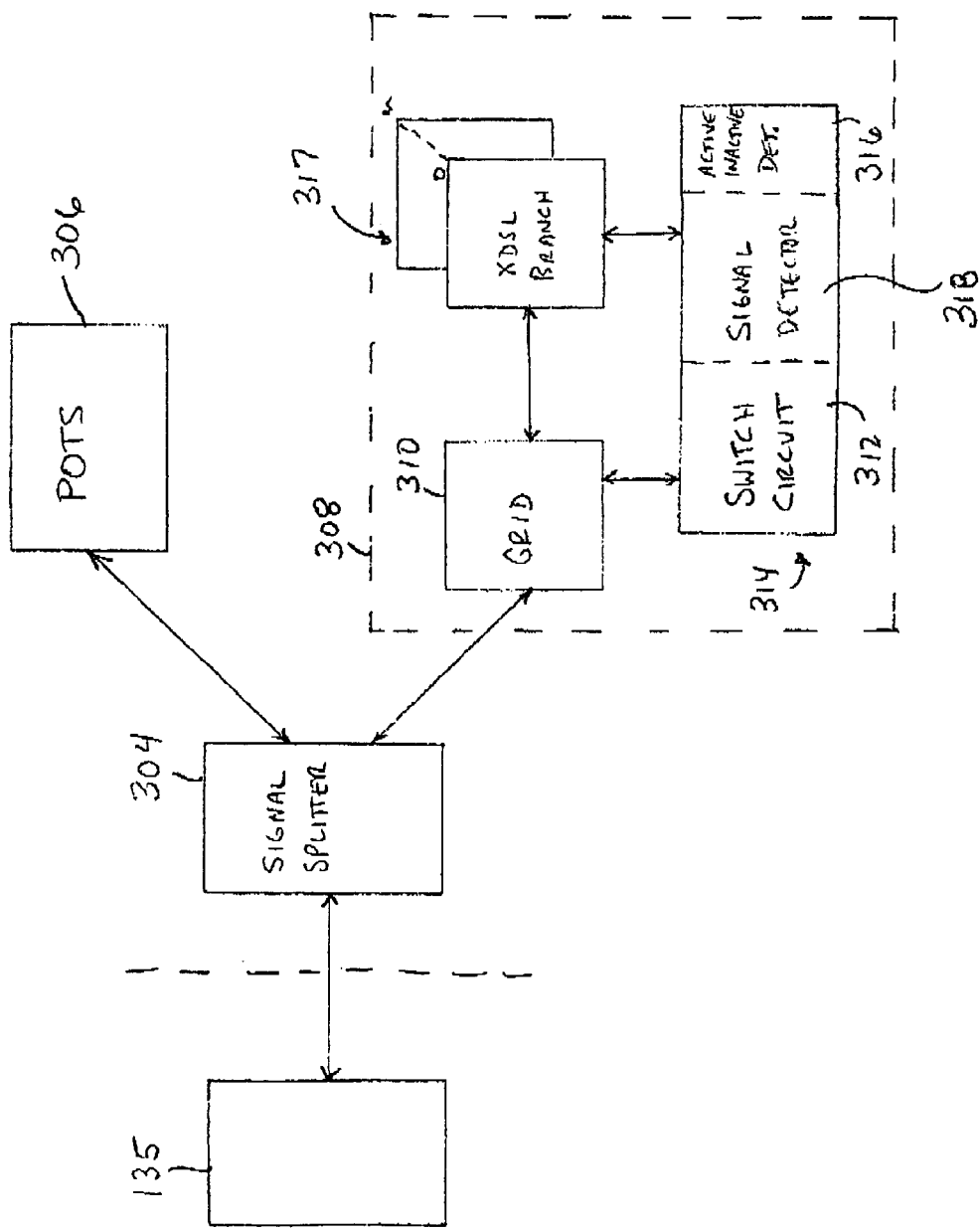
FIG. 3 is a block diagram of another aspect of the present invention for providing POTS and XDSL services.

Referring now to FIG. 3, a block diagram illustrates a system 300 in accordance with another aspect of the present invention which is adapted for use with the L3 mode of operation of G.lite as described in the ITU ADSL standards. It should be appreciated that many of the block diagrams illustrated in FIG. 3 may correspond to one or more components described with respect to FIG. 2. In the L3 mode, pilot tones are not transmitted during sleep mode. The CPE 135 is comprised of the POTS splitter 138, the XDSL interface 140, the telephone instrument 136 and the personal computer 142 as described above. The XDSL interface 140 communicates with a signal splitter 304 via the POTS splitter 138. The signal splitter 304 transmits POTS signals to and from the POTS system 306 and transmits XDSL signals to and from a data system 308.

The data system 308 comprises a crosspoint grid 310 for routing the XDSL signals in response to a switch circuit 312 in a controller 314. The controller 314 further comprises an active/inactive detector 316 for detecting which of data, or XDSL branches 317 are active and inactive. A signal detector 318 in the controller 314 detects when wake-up signals arrive from the XDSL interface 140. As noted, the XDSL interface 140 is not transmitting any pilot tones when in sleep mode in L3 operation. When XDSL communications are desired, the XDSL interface 140 transmits a wake-up signal to the signal splitter 304 which routes the wake-up signal to the crosspoint grid 310.

The signal detector 318 of the controller 314 senses the wake-up signal and notifies the active/inactive detector 316. The active/inactive detector 316 checks the XDSL branches 317 to determine which are inactive, or have been inactive for a set time period. Once an inactive XDSL branch 317 is identified, the controller 314, through the switch circuit 310, instructs the crosspoint grid 310 to connect the XDSL interface 140 to the inactive XDSL branch 317. Although not shown, the controller 314 also notifies the network switch 148 that the XDSL interface 140 is being connected to the inactive XDSL branch 317. Other than described above, the components in FIG. 3 operate in a similar manner as those described with respect to FIG. 2.

For clarity and ease of description, the structure, control and arrangement of the conventional components and circuits have, for the most part, been illustrated in the drawings by readily understandable block representations and schematic diagrams, which show only those specific details that are pertinent to the present invention. These block representations and schematic diagrams have been employed in order not to obscure the disclosure with structural details which will be readily apparent to those skilled in the art having the benefit of the description herein.

While the specification in the invention is described in relation to certain implementations or versions, many details are set forth for the purpose of illustration. Thus, the foregoing merely illustrates the principles of the invention. For example, this invention may have other specific forms without departing from its spirit or essential characteristics. The described arrangements are illustrated and not restricted. To those skilled in the art the invention is susceptible to additional implementations or embodiments and certain of the details described in this application can be varied considerably, without departing from the basic principles of the invention. It will thus be appreciated that those skilled in the art will be able to devise various arrangements which, although not explicitly described or shown herein, embody the principles of the invention. They are thus within the spirit and scope of the present invention.

What is claimed is:

1. A system for providing data communications between a first digital subscriber line data device and a network switch comprising:
    a pilot branch for communicating with the first digital subscriber line data device via pilot signals when the first digital subscriber line data device is in a sleep mode;
    a data branch for providing data communications between the first digital subscriber line data device and the network switch when the first digital subscriber line data device is active; and
    a controller circuit for monitoring the pilot signals and for switching the first digital subscriber line data device from the pilot branch to the data branch when the first digital subscriber line data device becomes active based on the pilot signals;
    wherein the controller circuit comprises a crosspoint device for switching the first digital subscriber line data device from the pilot branch to the data branch and for switching a second digital subscriber line data device from the data branch to the pilot branch when the first digital subscriber line data device is switched from the pilot branch to the data branch in response to the controller; and
    wherein the controller circuit monitors operation of the second digital subscriber line data device and, based on the monitored operation, instructs the crosspoint device to switch the second digital subscriber line data device.

2. The system as recited in claim 1 wherein the controller circuit detects when the second digital subscriber line data device is inactive and instructs the crosspoint device to switch the second digital subscriber line data device from the data branch to the pilot branch when the second digital subscriber line data device is inactive.

3. The system as recited in claim 1 wherein the controller circuit comprises:
    a receiver grid for switching data communications received from the first digital subscriber line data device to the network switch from the pilot branch to the data branch; and a transmit grid for switching data communications transmitted from the network switch to the first digital subscriber line data device from the pilot branch to the data branch.

4. The system as recited in claim 3 wherein the controller circuit comprises:
a controller for instructing the receiver grid and the transmit grid to switch the data communications based on the pilot signals.

5. The system as recited in claim 1 wherein the pilot signals are single tone carrier signals.

6. A system for routing data transmitted over a digital subscriber line that couples a communication interface and an interface circuit comprising:
a pilot circuit transmitter for transmitting a pilot signal to the communication interface;
a crosspoint circuit for receiving a wake-up signal in response to the pilot signal from the interface circuit;
a controller for determining a route of the wake-up signal over the digital subscriber line and for instructing the crosspoint circuit to transmit the wake-up signal in accordance with the determined route.

7. The system as recited in claim 6 wherein the pilot signal is a single tone carrier signal.

8. The system as recited in claim 6 wherein the data branch comprises:
a XDSL transmitter for transmitting the data communications from the communication interface to the interface circuit; and
a XDSL receiver for receiving the data communications from the interface circuit via the communications interface.

9. The system as recited in claim 6 wherein the data communications are digital subscriber line communications.

10. The system as recited in claim 9 wherein the data communications are asymmetric digital subscriber line communications.

11. The system as recited in claim 9 wherein the data communications are asymmetric digital subscriber line lite communications.

12. The system as recited in claim 9 wherein the data communications are very high speed digital subscriber line communications.

13. A system for providing data communications between a first digital subscriber line data device and a network switch comprising:
a pilot branch for communicating with the first digital subscriber line data device via pilot signals when the first digital subscriber line data device is in a sleep mode;
a data branch for providing data communications between the first digital subscriber line data device and the network switch when the first digital subscriber line data device is active;
a controller circuit for monitoring the pilot signals and for switching the first digital subscriber line data device from the pilot branch to the data branch when the first digital subscriber line data device becomes active based on the pilot signals;
wherein the first digital subscriber line data device employs the pilot branch only while in the sleep mode;
wherein the first digital subscriber line data device employs the data branch only while in the active mode.

14. The system of claim 6, wherein the pilot circuit transmitter transmits the pilot signal to the communication interface only while the communication interface is in a sleep mode.

* * * * *